May 16, 1950     L. E. KUENTZEL     2,507,984
PAINT REMOVER COMPOSITION
Filed Nov. 1, 1945
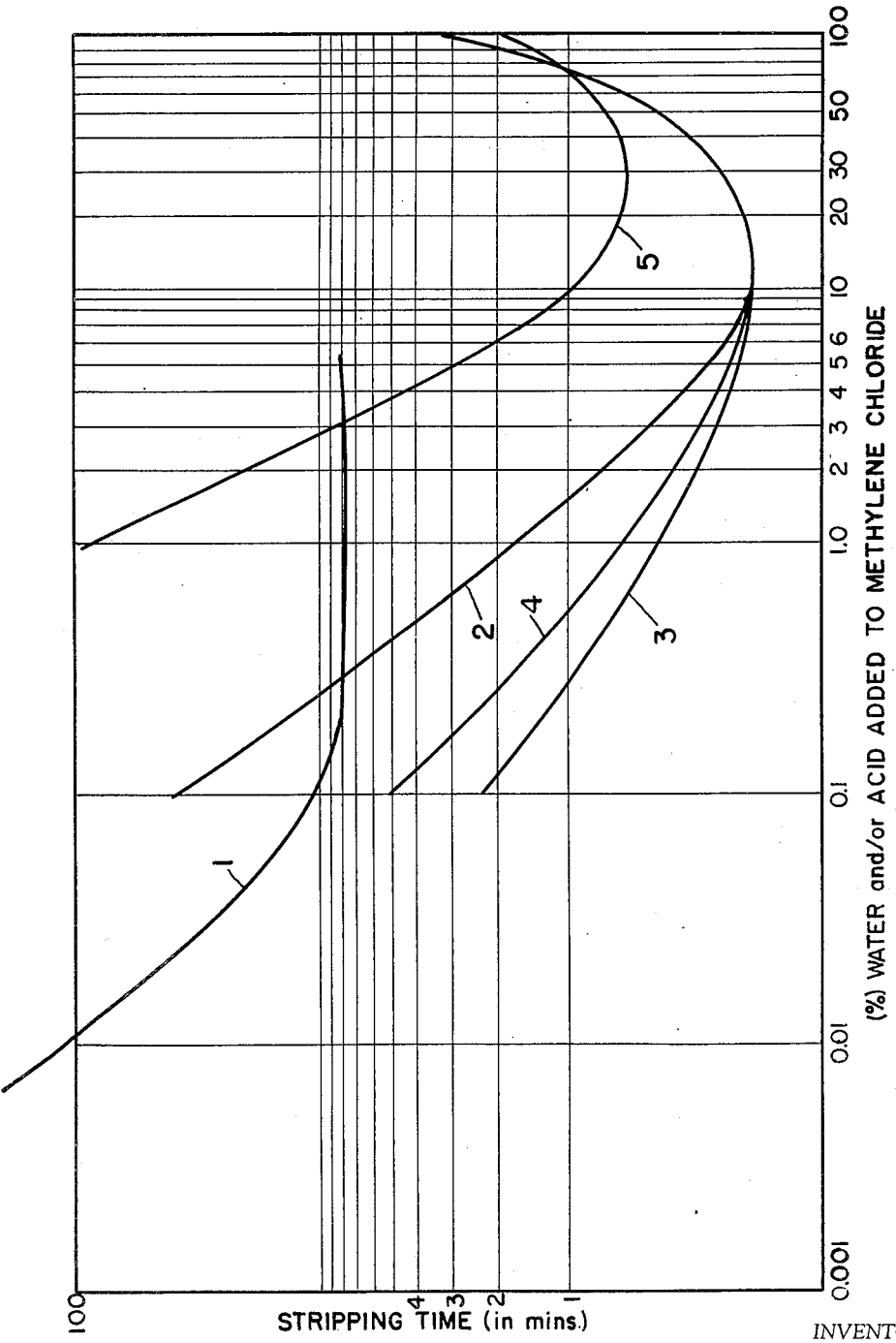
Panel No. 14105
INVENTOR.
LESTER E. KUENTZEL
BY William R. Day
ATTORNEY Patented May 16, 1950

2,507,984

UNITED STATES PATENT OFFICE 2,507,984

PAINT REMOVER COMPOSITION

Lester E. Kuentzel, Wyandotte, Mich., assignor to Wyandotte Chemicals Corporation, Wyandotte, Mich., a corporation of Michigan Application November 1, 1945, Serial No. 626,173

4 Claims. (Cl. 252—143)

This invention relates to compositions for removing or stripping paint, varnish, enamel, lacquer and the like from surfaces of metal, wood, glass, fabrics or brushes. The prime objective of my invention is to provide a paint remover which has high stripping power, i. e. capable of loosening the coating in a minimum period of time. This property is highly desirable in a paint remover since it contributes both to the reduction of time and labor required for stripping, as well as to the efficiency of the action of the remover.

Chlorinated aliphatic hydrocarbon solvents have heretofore been used and formulated to a considerable extent as ingredients of paint removers. I have made the discovery that the presence of a small amount of certain selected acids greatly improves the stripping power of methylene chloride; and that the addition of a small amount of water to the methylene chloride and acid mixture imparts still greater stripping power.

Both acid and water ingredients of the paint remover embodying the principle of my invention are thus believed to function as solvent activating catalysts, which result in the remarkably enhanced stripping power of the methylene chloride solvent.

Additional objectives and advantages of my invention shall become apparent as the following description proceeds.

To the accomplishment of the foregoing and related ends, the following description and annexed drawing set forth in detail the nature of my invention and the best mode of applying the principle thereof whereby those skilled in the art may be enabled readily to understand and practice same.

The annexed drawing is a chart, on logarithmic scale, showing the relationship between the stripping power and variation in water and acid additives on methylene chloride.

The particular acids, whether organic or inorganic, which are capable of imparting the desired activating action to methylene chloride do not follow any predictable pattern. I have tested and examined over forty different acids and found the following which peculiarly adapted to function and operate in my paint remover compositions, the degree of their activating effect upon the stripping ability being substantially as of the order given:

Formic
Acetic
Propionic
Salicylic
Butyric

Carbolic (phenol)
Nitric
Benzoic
Cinnamic

It is recognized that chlorinated hydrocarbon solvents in general, and methylene chloride to a slight extent, have the tendency to decompose after a period of time or to hydrolyze in the presence of moisture, light, and elevated temperatures, to form hydrochloric acid. However, such a possible latent or inherent presence of acid in the methylene chloride solvent is obviously not included within the purview of my invention, since not only does my invention contemplate the addition of an acid not inherently present or generated in the methylene chloride, but also, hydrochloric acid is one of those acids which have been found to depress rather than promote the stripping power thereof.

Additional ingredients including thickening agents, blending agents, an evaporation retardant, (such as paraffin wax) and wetting agents, (such as alkylated aromatic sodium sulfonates) may also be incorporated to advantage into the composition, as more fully set forth in my copending application Serial No. 626,172 filed November 1, 1945. These wetting agents are of particular advantage because they impart a greater removability of the paint remover composition by water, even when water-insoluble materials such as wax and methyl cellulose are present. Wetting agents of the alkyl aryl sulfonate type have been found to be quite satisfactory in the formulation of compositions embodying the principle of my invention. Specifically, alkyl aryl sulfonate wetting agents are available on the market under the trade names of "Santomerse D" and "Wetsit Concentrated." "Santomerse D" is a substantially 99% dodecylbenzene sodium sulfonate. "Wetsit Concentrated" is a proprietary alkyl aryl sulfonate containing a minor proportion of terpenes and about 20% water content. The alkyl and aryl groups of such latter form of alkyl aryl sulfonate are not definitely known or publicized, such information being the private property of the manufacturer of such product. "Wetsit Concentrated" is particularly suitable since it contains approximately 20% water and thus serves as a convenient means for adding the water ingredient to the composition, making it unnecessary to add water separately as there is enough water in such wetting agent to satisfy the formulation requirements.

The remarkable ability of relatively small amounts of water and acid to enhance or accelerate the stripping power of the methylene chloride is shown in the following tabulated results where methylene chloride alone, and methylene chloride containing water and different selected acids (separately and jointly) were applied to standard painted test panels. These test panels comprised U. S. Navy panels 72 and 75E as recited in Navy Aeronautical Specification C–113, Amendment-2; and United States Army Air Force test panels Nos. 14105 and 14109, as recited in Army Air Force Specification No. 14119. The detailed description of these stripping test panels is set forth in my copending application Serial No. 509,121, now U. S. Pat. No. 2,433,517 issued Dec. 30, 1947.

*Table I*

| Per cent by Weight of Water Added to Methylene Chloride | Stripping Power (time in seconds to completely loosen coating from panels) | |
| --- | --- | --- |
|  | 14105 | 14109 |
| 0.000 | over 10,000 | 9000 |
| 0.003 | over 10,000 | 1500 |
| 0.015 | 5,400 | 720 |
| 0.030 | 3,300 | 600 |
| 0.073 | 900 | 300 |
| [1] 0.15 | 480 | 150 |
| 5.00 | 500 | 150 |

[1] Saturated solution of water in methylene chloride.

The methylene chloride used in the mixtures of the foregoing Table I was first carefully distilled to remove any possible trace of water.

Curve 1 in the drawing shows the relationship of stripping power on panel No. 14105 to percentage of water present. It will be seen that the maximum stripping power is reached at about 0.3% water content and it is maintained up through 5%.

*Table II*

| Per cent by Weight of Acetic Acid Added to Methylene Chloride (100% Glacial) | Stripping Power (time in seconds to completely loosen coating from panels) | |
| --- | --- | --- |
|  | 14105 | 14109 |
| 0.000 | over 10,000 | 9000 |
| 0.2 | 1,500 | 180 |
| 1.0 | 300 | 130 |
| 9.09 | 10 | 80 |
| 16.66 | 10 | 100 |
| 28.6 | 20 | 180 |
| 37.5 | 40 | 240 |
| 50.0 | 40 | 250 |
| 62.5 | 60 | 360 |
| 83.3 | 60 | 930 |
| 95.2 | 160 | 1620 |
| 100.0 | 180 | 2700 |

Curve 2 in the drawing illustrates the manner in which the addition of acetic acid accelerates the stripping power of methylene chloride. The improvement is quite rapid from 0.1 to 10% and thence it drops off a little more slowly.

*Table III*

| Per Cent by Weight of Water Added to Methylene chloride | Per Cent by Weight of Glacial Acetic Acid Added to Methylene Chloride | Stripping Power (time in seconds to completely loosen coating from panels) | |
| --- | --- | --- | --- |
|  |  | 14105 | 14109 |
| 0.00 | 0.00 | over 10,000 | 9000 |
| 0.15 | 0.00 | 480 | 150 |
| 0.15 | 0.20 | 70 | 120 |
| 0.15 | 1.00 | 60 | 120 |
| 0.15 | 10.00 | 10 | 100 |
| 5.0 | 0.00 | 500 | 150 |
| 5.0 | 0.20 | 180 | 140 |
| 5.0 | 1.00 | 30 | 90 |
| 5.0 | 10.00 | 10 | 50 |

Curve 3 represents the 0.15% constant water-acetic acid-methylene chloride composition and curve 4 is the 5.0% water-acetic acid-methylene chloride composition, wherein the change in stripping power on panel No. 14105 as the acetic acid content is increased, is shown. It is to be noted that the presence of both water and acetic acid imparts a still greater stripping power than in the case of acetic acid addition only. Compare curves 3 and 4 with curve 2.

*Table IV*

| Percent by Weight of Carbolic Acid Added to Methylene Chloride | Stripping Power (time in seconds to completely loosen coating from panels) | |
| --- | --- | --- |
|  | 14105 | 14109 |
| 0.000 | over 10,000 | 9000 |
| 0.5 | 3,600 | 3000 |
| 1.0 | 3,600 | 2400 |
| 4.76 | 540 | 240 |
| 7.40 | 120 | 150 |
| 9.09 | 75 | 150 |
| 11.7 | 60 | 150 |
| 16.6 | 45 | 150 |
| 20.0 | 30 | 150 |
| 25.0 | 30 | 150 |
| 28.6 | 30 | 150 |
| 33.3 | 30 | 150 |
| 40.0 | 30 | 180 |
| 50.0 | 30 | 225 |
| 55.5 | 45 | 240 |
| 66.6 | 60 | 300 |
| 76.9 | 60 | 510 |
| 83.3 | 60 | 600 |
| 90.9 | 75 | 780 |
| 99.0 | 120 | 1200 |
| 100.0 | 120 | 1500 |

In the above table, the use of 88% phenol necessarily includes the presence of varying amounts of water, i. e., 12% of the stated percentage of 88% phenol.

Curve 5 of the drawing plots the values given in Table IV for panel No. 14105. It should be noted that the characteristics of this curve are very similar to those of curve 2 (acetic acid and methylene chloride), although higher percentages of 88% phenol are required to attain similar stripping time values. At above approximately 50% acid content (anhydrous basis) for both curves 2 and 5, the stripping time begins to drop off again and becomes greater than one minute. This effect is, of course, all the more sharply pronounced in the case of the stripping time values for panel No. 14109. For not only this reason, but also for commercial, economic and safety considerations, an acid content of 50% by weight of the total composition becomes the maximum upper limit.

Table V

| Composition of Remover (parts by volume) | | Water | Stripping Power (time in seconds to completely loosen coating from panels) | | | |
|---|---|---|---|---|---|---|
| Methylene Chloride | Salicylic Acid | | 72 | 75E | 14105 | 14109 |
| 10 | ---- | ---- | 600 | (¹) over 10,000 | (¹) over 10,000 | (¹) over 10,000 |
| 10 | 0.1 | ---- | 240 | 1,200 | 1,800 | 1,800 |
| 10 | 0.1 | 0.01 | 60 | 120 | 720 | 720 |
| 10 | 0.1 | 0.1 | ---- | ---------- | 30 | 260 |

¹ Coating softened, but not loosened.

The following table sets forth the relative stripping power of the methylene chloride-acid-water compositions of which the acids denominated are those which I have discovered to posssess the unusual activating effect upon the stripping ability of methylene chloride or methylene chloride containing a small amount of water:

Table VI

| Composition (10 parts Methylene Chloride plus the following parts of acid and water; parts by volume, unless otherwise noted) | Stripping Power (time in seconds required to loosen coating completely on test panels) | |
|---|---|---|
| | 14105 | 14109 |
| Formic Acid 0.1, Water 0.1 | 10 | 50 |
| Acetic Acid 0.1, Water 0.1 | 20 | 110 |
| Propionic Acid 0.1, Water 0.1 | 30 | 130 |
| Salicylic Acid 0.1 (by wt.), Water 0.1 | 30 | 260 |
| Butyric Acid 0.1, Water 0.1 | 40 | 300 |
| Carbolic Acid 0.1 (by wt.), Water 0.1 | 40 | 170 |
| Nitric Acid 0.1, Water 0.1 | 100 | 260 |
| Benzoic Acid 0.1 (by wt.), Water 0.1 | 160 | 350 |
| Cinnamic Acid 0.1 (by wt.), Water 0.1 | 160 | 420 |

The unexpected nature of the above selected acids in improving the stripping power of methylene chloride or methylene chloride and water is further exemplified when it is considered that such acids as oxalic, tartaric, citric, boric and hydrochloric when admixed in the same proportions with methylene chloride and water as in the above table, all failed to produce a stripping action equal to the time required for methylene chloride and water alone. Hence, it will be seen that certain acids, both organic and inorganic, tend to suppress rather than activate or enhance the stripping ability of the methylene chloride solvent.

As will be seen from annexed drawing, the stripping power activating effect of the acid ingredients is to be found in the range of 0.1 to 50% by weight of acid on the basis of the total composition. Likewise, the preferred range of water content is 0.01 to 6% by weight on the basis of the total composition. The following examples set forth some preferred formulations embodying my invention and serving as a further illustration, but not limitation, thereof. The following formulations, having methyl cellulose and methanol present possess thixotropic properties, the advantages of which are more fully described in my copending U. S. patent application Serial No. 626,172 filed November 1, 1945.

Example 1

[Information No. 1070]

| Constituent | Amount | Per cent By Weight | Per cent Water Content | Stripping Power | | | | |
|---|---|---|---|---|---|---|---|---|
| | | | | 70E | 72 | 75E | 14105 | 14109 |
| Methylene Chloride | 100 cc | 78.78 | | 30 | 30 | 30 | 150 | 75 |
| Paraffin | 1 g | 0.59 | | | | | | |
| Methyl Cellulose (4000 cps.) | 2 g | 1.18 | | | | | | |
| Water | 2 cc | 1.18 | 1.18 | | | | | |
| "Wetsit Concentrated" | 10 cc | 5.90 | 1.18 | | | | | |
| Methanol | 14 cc | 6.54 | | | | | | |
| Propionic Acid | 10 cc | 5.83 | | | | | | |
| | | 100.00 | 2.36 | | | | | |

Example 2

[Formulation No. 1205]

| Constituent | Amount | Per cent By Weight | Per cent Water Content | Stripping Power | | | | |
|---|---|---|---|---|---|---|---|---|
| | | | | 70E | 72 | 75E | 14105 | 14109 |
| Methylene Chloride | 100 cc | 87.80 | | 10 | 20 | 10 | 80 | 70 |
| Paraffin | 1 g | 0.65 | | | | | | |
| Methyl Cellulose (4000 cps.) | 1 g | 0.65 | | | | | | |
| "Wetsit Concentrated" | 5 cc | 3.29 | 0.658 | | | | | |
| Formic Acid (90%) | 1 cc | 0.70 | 0.070 | | | | | |
| Acetic Acid (Glacial) | 1 cc | 0.65 | | | | | | |
| Methanol | 12 cc | 6.25 | | | | | | |
| "Patent Blue" Dye* | 0.02 g | 0.01 | | | | | | |
| | | 100.00 | 0.728 | | | | | |

\* "Patent Blue" dye is also known as "Xylenblau"; for its chemical constituency, refer to "Farben-Chemie" Fierz-David and Blangey (J. W. Edwards, 1944), p. 286.

The stripping abilities of these two above formulations are noted under the sub-heading "Stripping Power," for the U. S. Navy Aeronautical Specification test panels 70E, 72 and 75E and U. S. Army Air Force Specification test panels 14105 and 14109.

In the following exemplary formulation, carbolic acid or phenol is employed as the acid ingredient, and a chemically basic compound, such as caustic soda, water glass, morpholine and the like, added, which has the effect of improving the non-corrosiveness of the composition on metals. The stripping power of the following formulation is equivalent to that of the formulations previously given.

Example 3
[Formulation No. 2346]

| Constituent | Amount | Per cent By Weight | Per cent Water Content | Stripping Power: | | | | |
|---|---|---|---|---|---|---|---|---|
| | | | | 70E | 72 | 75E | 14105 | 14109 |
| Methylene Chloride | 100 cc | 80.96 | | 15 | 10 | 10 | 30 | 40 |
| Paraffin Wax | 4 g | 2.43 | | | | | | |
| Methyl Cellulose (1500 cps.) | .1 g | 0.61 | | | | | | |
| "Wetsit Concentrated" | 5 cc | 3.03 | 0.606 | | | | | |
| Water Glass | 1 cc | 0.85 | | | | | | |
| Phenol (solid) | 20 g | 12.12 | | | | | | |
| | | 100.00 | 0.606 | | | | | |

Equivalent modes of practicing my invention may be followed provided that they are within the scope and purview of the appended claims.

I, therefore, distinctly claim and particularly point out as my invention:

1. A paint remover composition consisting essentially of methylene chloride and 0.1 to 50% by weight, anhydrous basis, of an acid selected from the group consisting of formic, acetic, propionic, salicylic, butyric, carbolic, benzoic and cinnamic acids; and water in the amount of 0.01 to 6.0% by weight on the basis of the total composition.

2. A paint remover composition consisting essentially of methylene chloride present in major proportion, 0.1 to 50% by weight, anhydrous basis, of formic acid, and 0.01 to 6.0% of water by weight on the basis of the total composition.

3. A paint remover composition consisting essentially of methylene chloride present in major proportion, 0.1 to 50% by weight, anhydrous basis, of acetic acid, and 0.01 to 6.0% of water by weight on the basis of the total composition.

4. A paint remover composition consisting essentially of methylene chloride present in major proportion, 0.1 to 50% by weight, anhydrous basis, of carbolic acid, and 0.01 to 6.0% of water by weight on the basis of the total composition.

LESTER E. KUENTZEL.

REFERENCES CITED

The following references are of record in the file of this patent:

UNITED STATES PATENTS

| Number | Name | Date |
|---|---|---|
| 1,095,270 | Ellis | May 5, 1914 |
| 1,147,849 | Ellis | July 27, 1915 |
| 1,147,850 | Ellis | July 27, 1915 |
| 1,918,224 | Wilson | July 11, 1933 |
| 2,327,701 | Ellis | Aug. 24, 1943 |
| 2,418,138 | Packer | Apr. 1, 1947 |

FOREIGN PATENTS

| Number | Country | Date |
|---|---|---|
| 485,857 | Great Britain | May 20, 1938 |